United States Patent [19]

Fenn

[11] 4,104,998
[45] Aug. 8, 1978

[54] ENGINE CONTROL SYSTEM
[75] Inventor: Gordon William Fenn, Mt. Clemens, Mich.
[73] Assignee: Chrysler Corporation, Highland Park, Mich.
[21] Appl. No.: 570,671
[22] Filed: Apr. 25, 1975
[51] Int. Cl.² .......................... F02P 5/04; F02H 3/00
[52] U.S. Cl. .......................... 123/117 R; 123/117 D; 123/32 EA
[58] Field of Search .......... 123/32 CA, 117 R, 117 A

[56] References Cited
U.S. PATENT DOCUMENTS

| | | | |
|---|---|---|---|
| 1,882,720 | 10/1932 | Arthur | 123/117 R |
| 3,672,345 | 6/1972 | Monpetit | 123/320 C |
| 3,774,582 | 11/1973 | Masaki | 123/117 R |
| 3,785,356 | 1/1974 | Niemoeller | 123/117 R |
| 3,788,291 | 1/1974 | Wu | 123/117 R |
| 3,788,291 | 1/1974 | Wu | 123/117 R |
| 3,793,833 | 2/1974 | Basshuyen | 123/117 R |
| 3,810,451 | 5/1974 | Fales | 123/117 R |
| 3,810,452 | 5/1974 | Morris | 123/117 R |
| 3,815,560 | 6/1974 | Wahl | 123/117 R |
| 3,828,743 | 8/1974 | Ludwig | 123/117 R |
| 3,919,983 | 11/1975 | Wahl | 60/276 |
| 3,923,023 | 12/1975 | Ito | 123/117 R |
| 3,978,832 | 9/1976 | Walker | 123/117 R |
| 3,978,833 | 9/1976 | Crall | 123/117 R |

Primary Examiner—Ronald B. Cox
Attorney, Agent, or Firm—Baldwin & Newtson

[57] ABSTRACT

A control system for an internal combustion engine provides controlled engine spark timing which is a function of a plurality of individual timing signals. These individual signals include a throttle advance signal, a programmed vacuum advance signal, a break-idle advance signal, an engine start advance signal, an engine speed advance signal and a fixed timing signal. These signals are algebraically summed together to develop a resultant spark timing signal representing desired spark timing. Individual signals are derived from transducer circuits which are responsive to various engine operating and/or ambient conditions. The throttle advance signal is a function of both a throttle position signal and a throttle rate signal and provides increasing advance as the throttle increasingly opens. It is also attenuated as the temperature of ambient air entering the engine for combustion increases. The programmed vacuum advance signal programs the vacuum advance in accordance with an accumulation function which is representative of the duration for which the engine has been operating in selected operating modes, namely idle and non-idle. The break-idle advance signal provides momentary advance when the engine throttle is displaced from the idle position. The engine start advance signal provides advance for a short interval after the engine has been started. The engine speed advance signal provides increasing advance as the engine speed increases. The fixed timing signal provides fixed timing which is used to adjust the basic timing for a given set of engine operating conditions. The control system is particularly advantageous when used in an engine which uses a leaner fuel-air mixture (17–18:1, for example) in comparison to presently used mixtures (15–16:1). Improvement accrues by way of reduction in exhaust emission products and better fuel economy.

73 Claims, 12 Drawing Figures

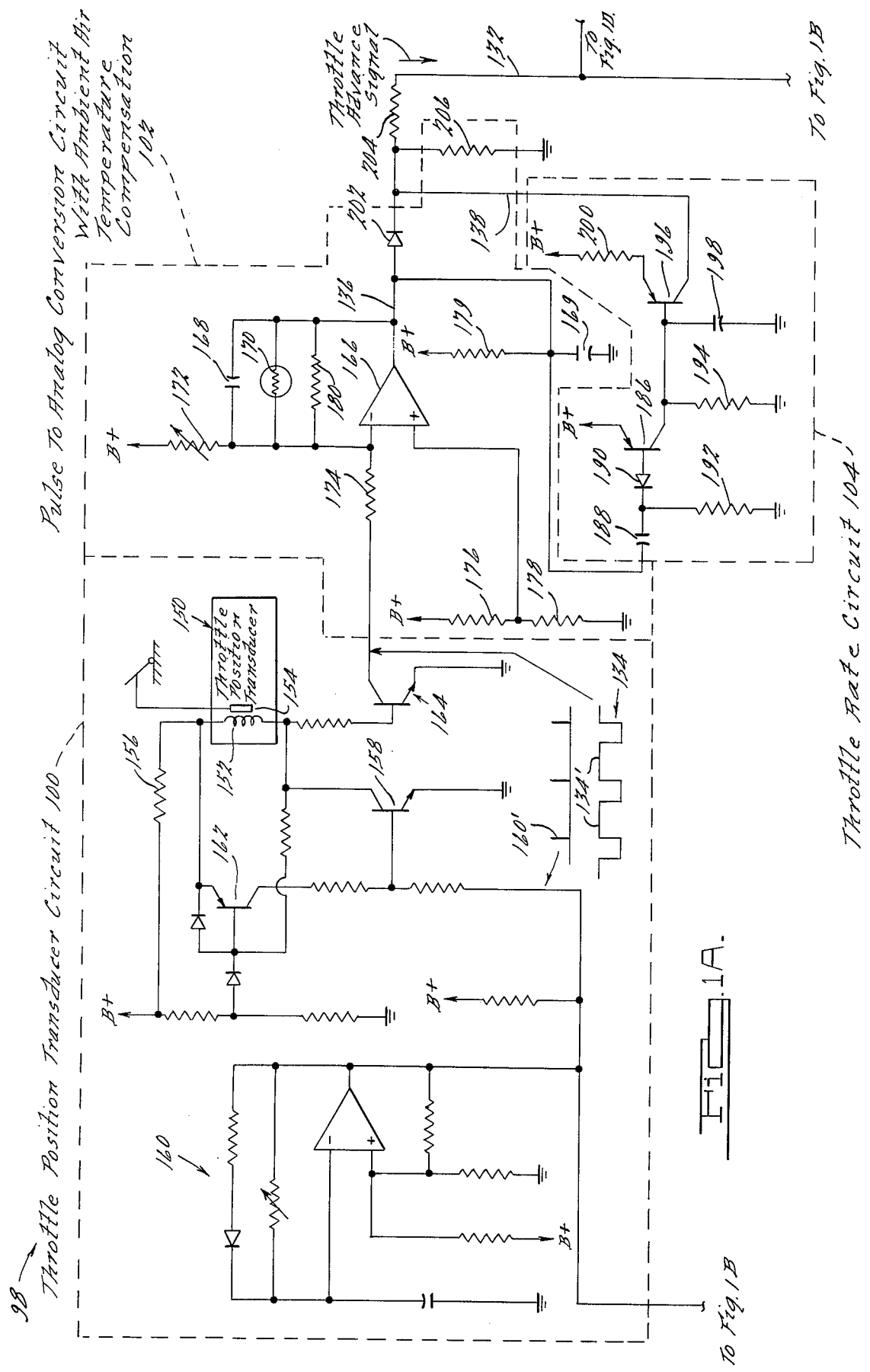

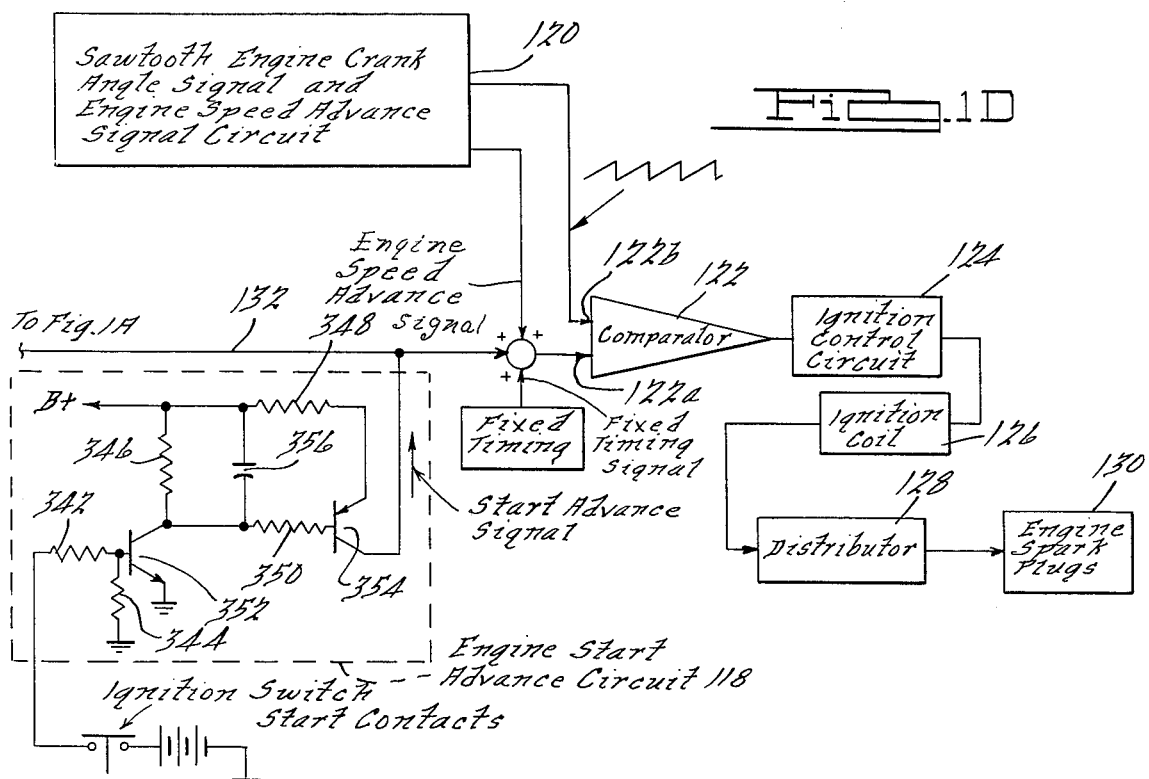
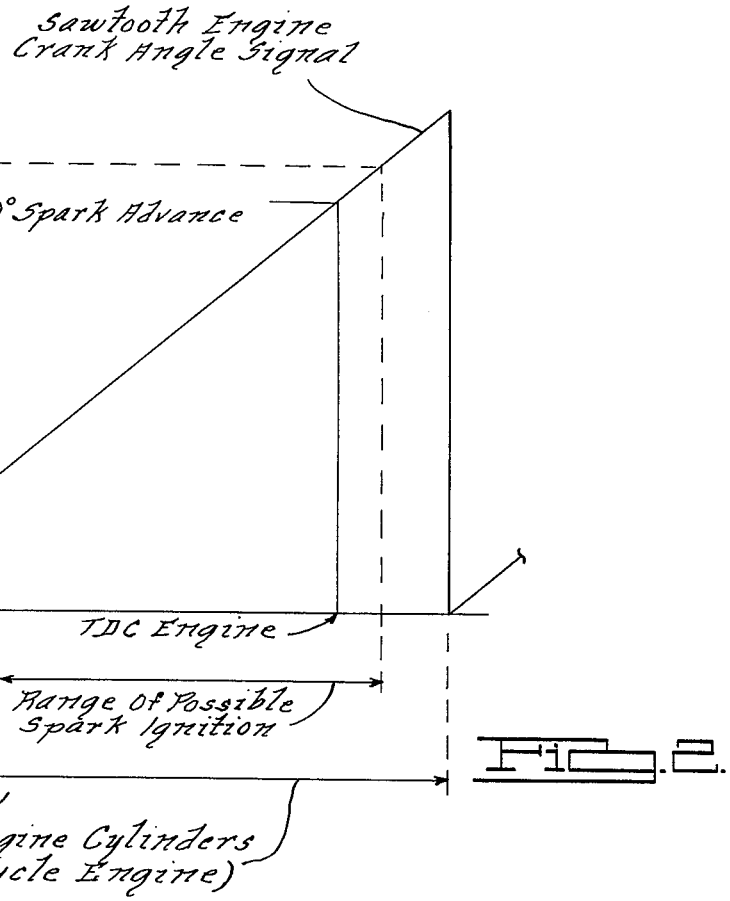

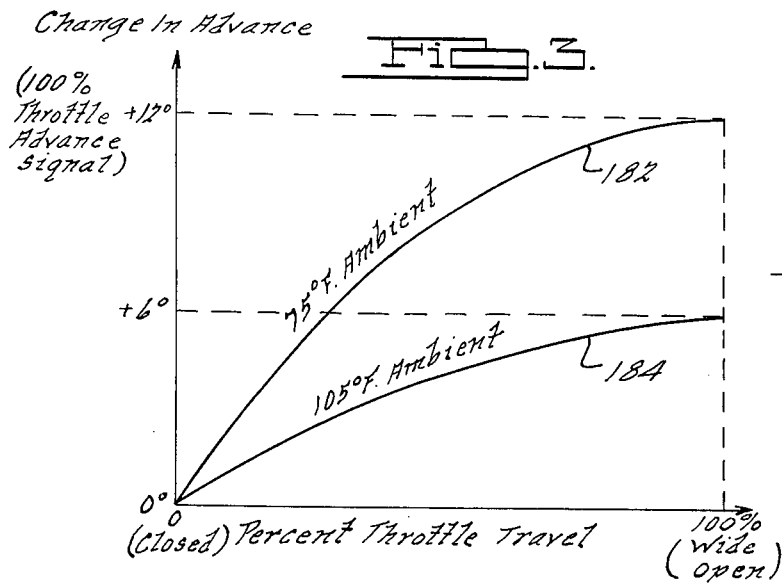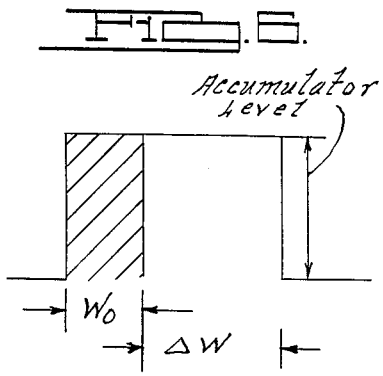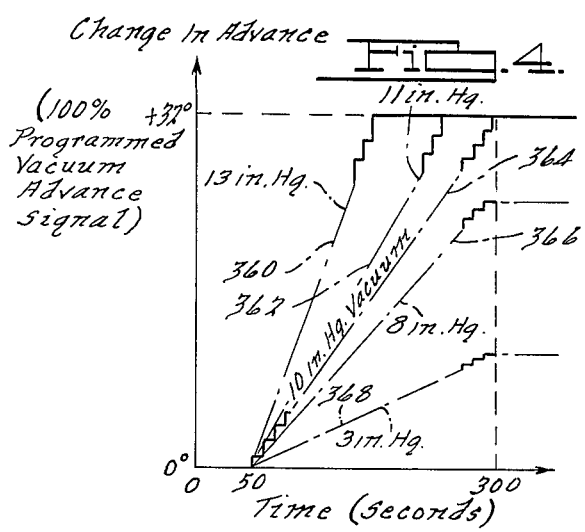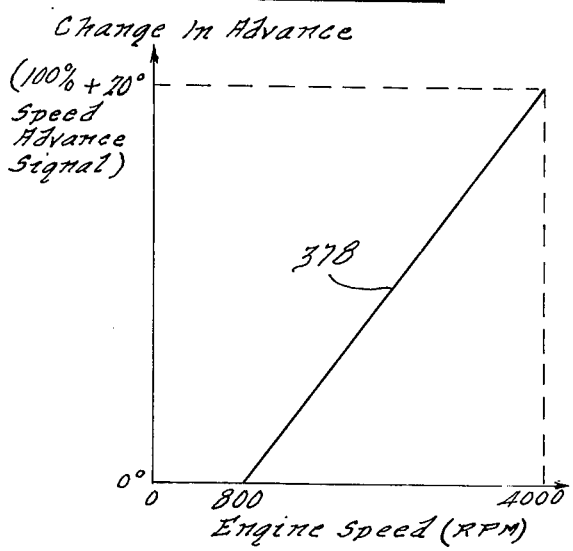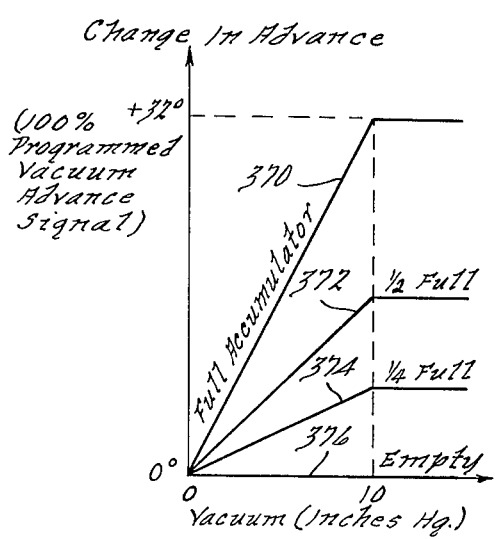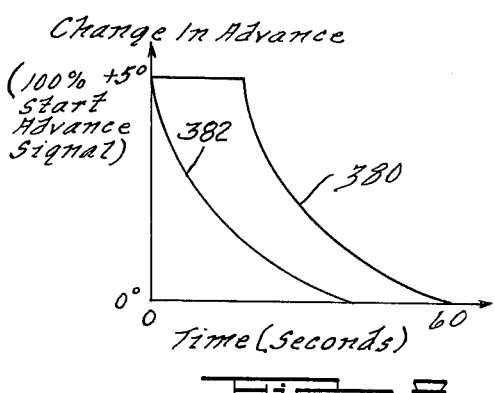

ENGINE CONTROL SYSTEM

BACKGROUND AND SUMMARY OF THE INVENTION

This invention relates broadly to engine control systems and more specifically to a novel control system for controlling engine spark timing. A system incorporating principles of the present invention, when used in conjunction with an internal combustion engine operating at a leaner fuel-air ratio (17–18:1, for example) than is presently customary in production automobile engines, has the potential for significant reductions in exhaust emissions while at the same time improving the fuel economy. Moreover, a system incorporating the present invention can potentially eliminate from the automobile a number of anti-pollution devices which have heretofore been essential to achieving lower exhaust emission levels.

Governmental regulations promulgated over the past few years have had a prominent impact on the American automobile industry, the most prominent impact perhaps being in the area of exhaust emissions. While few if any would quarrel with the admirable objective of having a totally pollution-free atmosphere, there is, because of economic and political considerations, considerable difference of opinion as to how best to work toward achieving this ultimate goal. Generally speaking, the trend has been to mandate increasingly reduced levels of vehicle exhaust emissions from year to year. Heretofore, the only available technology for securing compliance with mandated standards was in the form of anti-pollution controls and devices added to the basic engine. This anti-pollution equipment includes by way of example, EGR systems, catalytic converters, etc. and has greatly added to the basic cost of an automobile. Furthermore, a point of diminishing returns has clearly been reached with existing technology. Prospective regulations are even more stringent and the present state of technology offers no ready solution as to how to meet on a mass production basis even lower exhaust emission levels than those already in force.

The problem of achieving compliance with even present regulations, not to mention prospective ones, has been compounded by what is commonly referred to as the fuel crisis. Generally, the inclusion of anti-pollution equipment and devices to meet present regulations has made less efficient use of fuel and has, therefore, reduced automobile fuel economy. This is in addition to the reduction in fuel economy which is occasioned by other governmentally mandated regulations relating to safety and the like. With the advent of the fuel crisis, there is the real possibility that improved vehicle fuel economy will be mandated by regulation, either directly by specific fuel economy legislation or indirectly by an increased fuel tax or an excise tax on less efficient vehicles. Thus, the automobile industry is presented with the task of further reducing emission levels even though a point of greatly diminished returns has been reached and of simultaneously increasing the fuel economy of the automobile.

Many of those who are not directly involved with the automobile industry do not appreciate the problems which the industry faces. While certain ostensibly pre-eminent and learned authorities have publicly stated that prospectively mandated pollution and economy levels are not unreasonable in view of available technology, it is the automobile industry, and not they, which must comply with governmental regulations to remain in business. To date, no one has come forward with an anti-pollution system for an automobile vehicle which can guarantee compliance with prospective government regulations and which is capable of being economically mass produced by the automobile industry without imposing prohibitive costs on the consuming public.

The present invention is directed toward a novel engine control system which offers the potential for achieving compliance with regulations, both present and future, with respect to emission levels and vehicle economy. Moreover, a system according to the present invention offers the capability for achieving compliance with present regulations, and possibly even future regulations, without the use of anti-pollution equipment which is now common place on production automobile vehicles. Indeed, a system operating according to principles of the present invention can achieve compliance with present emission regulations without the use of such presently used anti-pollution devices as EGR systems, catalytic converters, etc. Moreover, in its preferred form, the present invention incorporates an electronic control system which utilizes available electronic circuit components and devices and which is less expensive than systems having catalytic converters, and EGR anti-pollution systems.

Overall, the present invention in its preferred embodiment pertains to an electronic engine spark timing control system in which a number of individual spark timing signals, which are derived from certain variable engine operating parameters depending upon how the engine is being operated and/or upon certain ambient conditions, are algebraically summed together to develop a resultant spark timing signal. The resulting spark timing signal is compared against a sawtooth engine crank angle signal representative of instantaneous engine crank angle and when a predetermined relationship between the two signals is obtained, a spark is generated. Since the resultant timing signal depends upon enging operation and ambient conditions, the time of spark generation is controlled in accordance therewith. One feature of the present invention relates to the provision of a throttle advance signal derived from the engine throttle. Another feature relates to a programmed vacuum advance signal which is developed from the instantaneous magnitude of engine vacuum but also depends upon the duration for which the engine has been operating in selected operating modes. Another feature relates to a break-idle advance signal which provides spark advance when the engine is accelerated from idle. Another feature relates to an engine start advance signal which provides the advance after the engine has been started. Other features relate to the manner in which the foregoing signals are derived and developed and to their cooperation in the overall engine system.

BRIEF DESCRIPTION OF THE DRAWINGS

FIGS. 1A, 1B, 1C, 1D should be considered together and represent a detailed schematic diagram of the system of FIG. 1.

FIGS. 2 through 8 are various graph plots useful in explaining the operation of the system shown in FIGS. 1, 1A, 1B, 1C and 1D.

The drawings illustrate a preferred embodiment of the present invention according to the best mode contemplated in carrying out the invention.

CROSS REFERENCE TO RELATED APPLICATIONS

Ser. No. 545,274, filed Jan. 30, 1975, F. W. Crall, L. W. Tomczak, and L. A. Caron, "Circuit for Generating A Sawtooth Engine Crank Angle Signal and an Analog Engine Speed Signal", assigned to the same assignee as the present application.

Ser. No. 599,203, now U.S. Pat. No. 3,997,801 filed March 17, 1975, L. A. Caron, L. W. Tomczak, F. W. Crall, "Transducer Circuits", assigned to the same assignee as the present application.

DESCRIPTION OF THE PREFERRED EMBODIMENT

Brief Description of the System

Figure 1:
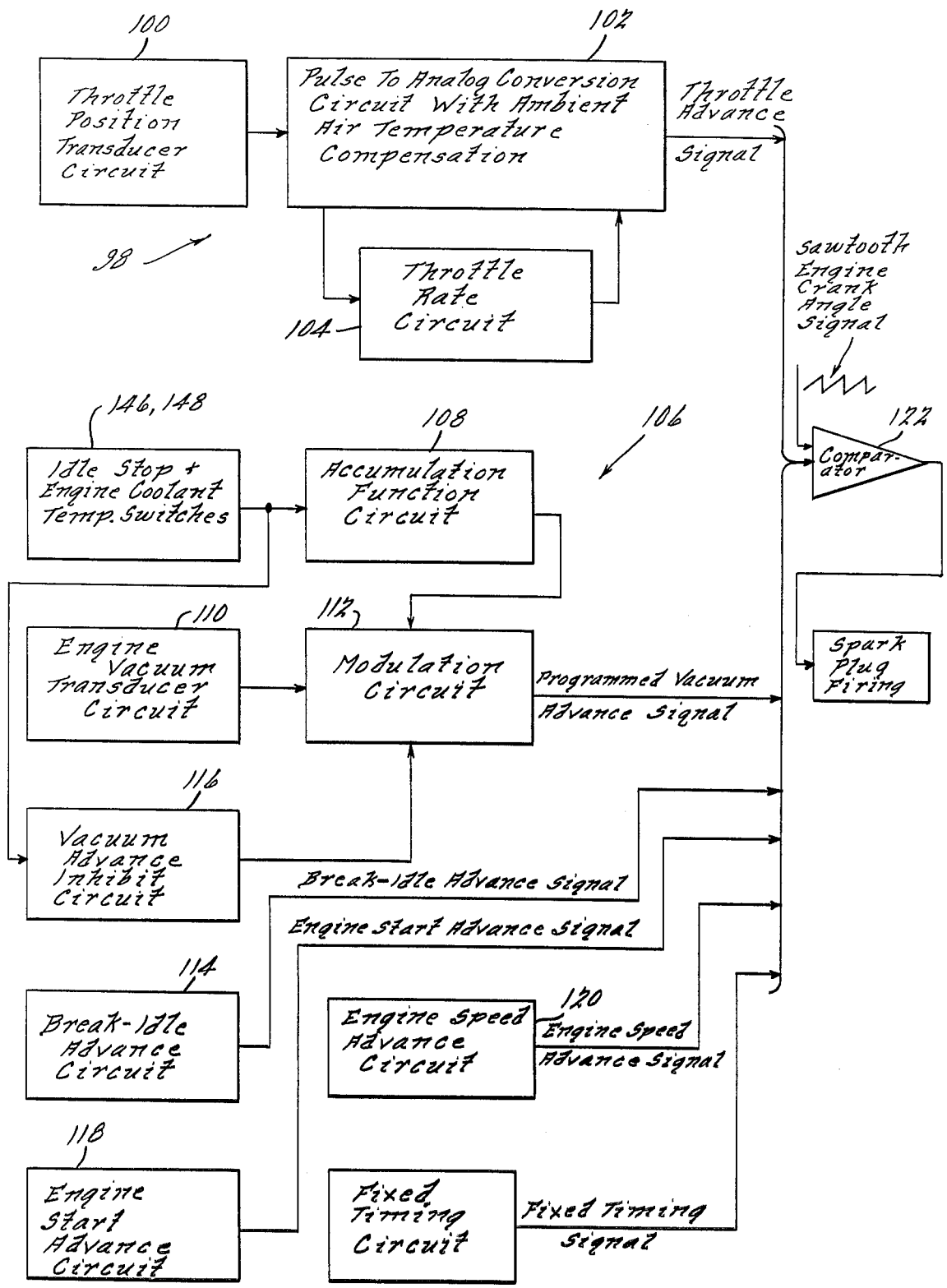
FIG. 1 is a schematic diagram of an exemplary engine control system embodying principles of the present invention.
Figure 1B:
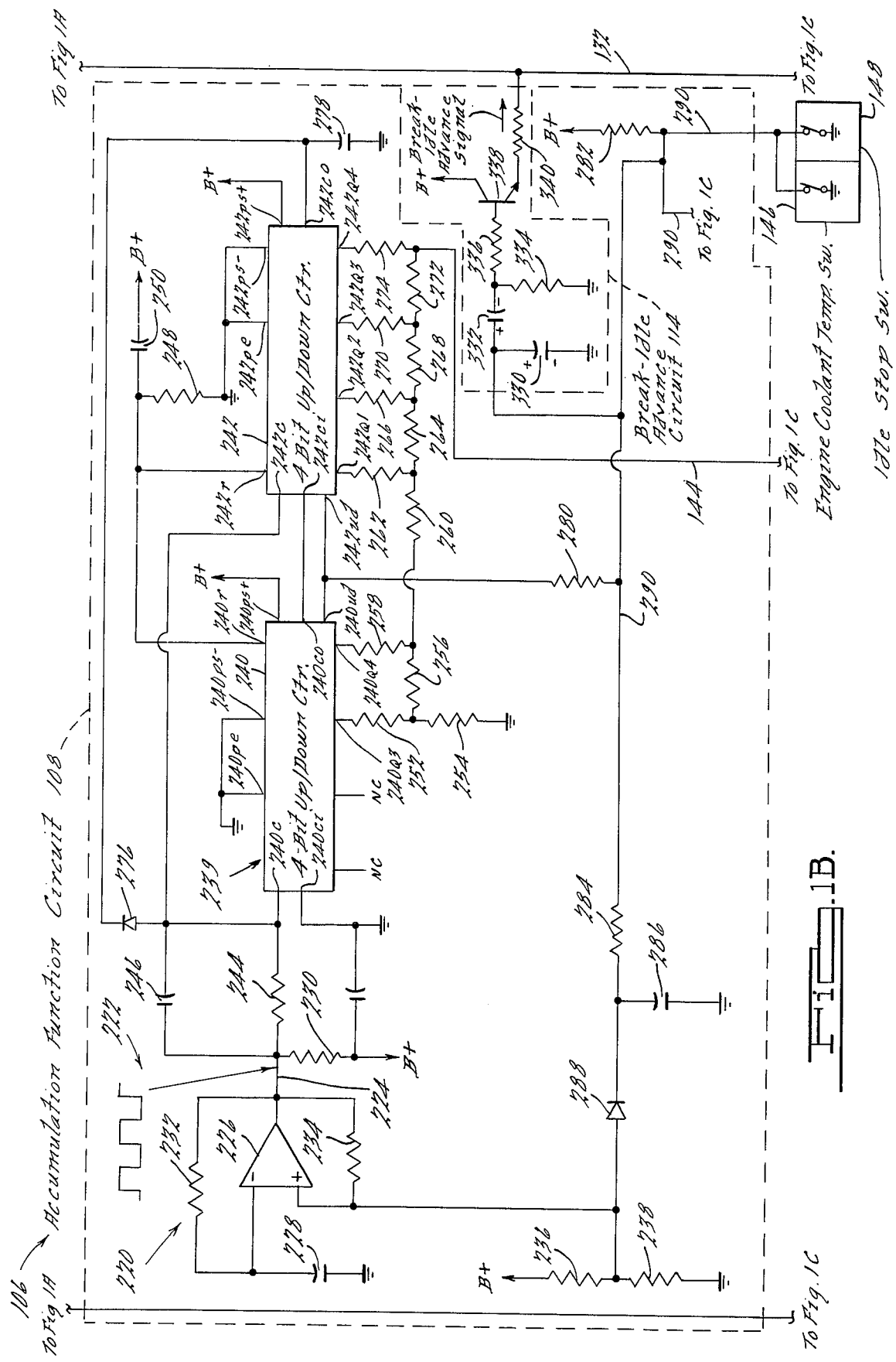
Figure 1C:
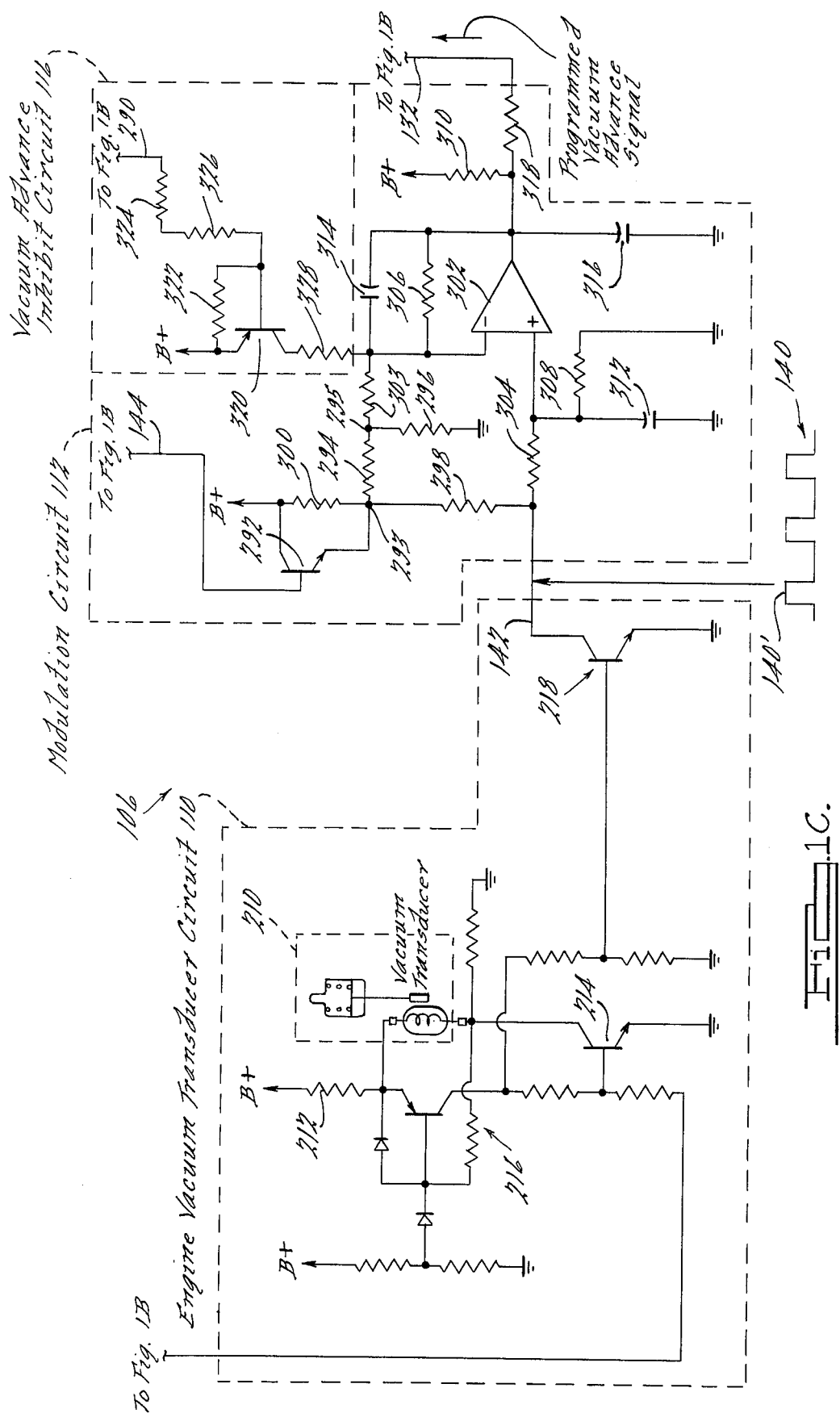

FIGS. 1A, 1B, 1C and 1D illustrate schematically a system incorporating principles of the present invention. (FIG. 1 shows the system in block diagram format.) Briefly, the system includes a throttle advance circuit 98 composed of a throttle position transducer circuit 100, a pulse to analog conversion circuit with ambient air temperature compensation 102, and a throttle rate circuit 104, (all in FIG. 1A); a vacuum advance program circuit 106 which comprises an accumulation function circuit 108 (FIG. 1B), an engine vacuum transducer circuit 110 (FIG. 1C), and a modulation circuit 112 (FIG. 1C); a "break-idle" advance circuit 114 (FIG. 1B); a vacuum advance inhibit circuit 116 (FIG. 1C); an engine start advance circuit 118 (FIG. 1D); a sawtooth engine crank angle signal and engine speed advance signal generating circuit 120 (FIG. 1D); a comparator circuit 122; an ignition control circuit 124; an ignition coil 126; a distributor 128; and spark plugs 130 (FIG. 1D). Details of throttle position transducer circuit 100 and engine vacuum transducer circuit 110 are disclosed in U.S. application Ser. No. 559,203 identified above, and the disclosure of that application is incorporated in the present application by reference. Details of circuit 120 are disclosed in U.S. application Ser. No. 545,274 identified above, and the disclosure of that application is also incorporated in the present application by reference. Comparator circuit 122, ignition control circuit 124, ignition coil 126, distributor 128 and spark plugs 130 are known, conventional ignition system components and details thereof are omitted from the present disclosure for sake of clarity and brevity.

In overall operation, the system controls the engine spark timing by algebraically summing a number of individual spark timing signals, which are derived from certain variable engine operating parameters which depend upon how the engine is being operated and/or upon certain ambient conditions. The resultant timing signal is compared against an engine crank angle signal, and when a predetermined relationship between the two signals is attained, a spark is generated. Since the resultant timing signal depends upon engine operation and ambient conditions, the time of spark generation is controlled in accordance therewith. Various features of the present invention contribute to this controlled spark timing which results in improved engine performance.

One feature of the present invention relates to the novel fashion in which throttle advance circuit 98 advances the spark timing in accordance with throttle operation. A throttle advance signal representing a certain amount of spark advance is developed by means of circuits 100, 102, and 104. This throttle advance signal is representative of throttle operation and the signal appears as current flow from circuit 102 at line 132, (see FIGS. 1A, 1B, 1C and 1D.) line 132 being a sum line at which the individual timing signals are summed. Throttle position transducer circuit 100 generates an output signal which is illustrated as a pulse waveform 134 in FIG. 1A. This output signal contains information indicative of the position of the engine throttle and may be considered as being composed of individual positive-going pulses 134' occurring at a constant frequency but having pulse widths in inverse proportion to the amount of throttle opening. In other words, the greater the pulse width, the less the throttle opening. Pulse to analog conversion circuit 102 monitors the pulse width of the pulses in waveform 134 to develop an analog throttle position signal appearing at line 136. The analog throttle position signal has a nominal magnitude representative of closed throttle position but increases in magnitude from this nominal level as the throttle increasingly opens. Throttle rate circuit 104 has its input connected to line 136 to monitor the analog throttle position signal. Circuit 104 is sensitive to the rate of change of the analog throttle position signal and develops an output signal at line 138 when a certain rate of change is detected as the throttle is increasingly opened. The throttle advance signal summed into sum line 132 may be considered as a function of both the analog throttle position signal appearing at line 136 and the throttle rate signal appearing at line 138, and as will be explained later, this function is essentially a logical "or" function. Ambient air temperature compensation is also provided for the throttle advance signal so that the magnitude of the signal is attenuated as the ambient air temperature increases over a predetermined range of temperatures. Thus, the amount of spark advance caused by throttle advance circuit 98 decreases as the ambient air temperature increases over this predetermined range of temperatures.

Another feature of the present invention relates to the provision of a start advance signal which is responsive to ignition switch operation to provide controlled timing advance of the spark for a limited time period subsequent to starting of the engine. This signal is provided by circuit 118 (FIG. 1D) which is a timer circuit actuated by the usual vehicle ignition switch. The signal appears as current flow from circuit 118 into sum line 132. This feature contributes to improved engine starting under extreme cold and hot ambient conditions.

A further feature of the present invention resides in the provision of a programmed vacuum advance signal by vacuum advance program circuit 106. Briefly, engine vacuum transducer circuit 110 develops a pulse waveform 140 (FIG. 1C) which is representative of the magnitude of engine manifold vacuum. This waveform appears at line 142. More specifically, waveform 140 is composed of positive-going pulses 140' occurring at a fixed frequency and having a pulse width which is representative of the magnitude of engine vacuum. Accumulation function circuit 108 provides an analog accumulation function signal which is representative of an accumulation function determined by the duration for which the engine has been operating in selected operating conditions. This accumulation function signal appears at line 144. In the present embodiment, an engine coolant temperature switch 146 and an engine idle stop switch 148 control the accumulation function circuit and, hence, the value of the accumulation function. Modulation circuit 112 receives the signals from engine vacuum transducer circuit 110 and accumulation function circuit 108 and modulates pulse waveform 140 by the value of the accumulation function signal to develop the programmed vacuum advance signal. Modulation circuit 112 outputs the programmed vacuum advance signal as current flow into line 132.

Further features of the invention relate to the manner in which the aforementioned signals cooperate to develop controlled engine spark timing. As already mentioned, line 132 represents the sum line at which the current signals which contribute to the resultant spark timing signal are algebraically summed. Thus, as should be obvious from the foregoing description, the throttle advance signal from throttle advance circuit 98, the break-idle advance signal from break-idle advance circuit 114, the programmed vacuum advance signal from vacuum advance program circuit 106 and the engine start advance signal from engine start advance circuit 118 are algebraically summed together at line 132. Additionally, an engine speed advance signal and a fixed timing signal are also summed at line 132. The engine speed advance signal is supplied from circuit 120 while the fixed timing signal is supplied from a presettable constant current source or sink. The engine speed advance signal provides a certain spark advance as a function of engine speed. The fixed timing signal is used to set desired spark timing when the values of the several timing advance signals are at selected levels. Thus, if it is assumed that each of the various spark timing signals is providing 0° of spark advance when the fixed timing signal is set, then the fixed timing signal establishes a fixed engine angle at which firing should occur, and the system will operate to controllably advance the spark timing from the fixed engine angle as the individual advance signals are generated by the individual circuits. The resultant timing signal representative of the algebraic summation of the individual signals is supplied to one input 122a (FIG. 1D) of comparator 122. The sawtooth engine crank angle signal representative of the instantaneous engine crank angle is supplied from circuit 120 to the other input 122b of comparator 122. Comparator 122 compares the magnitudes of the two signals, and the output of the comparator switches from one level to another level when the magnitude of the engine crank angle signal exceeds the magnitude of the resultant spark timing signal. Unit 124 is responsive to this transition in the output of comparator 122 to cause coil 126 to fire one of the spark plugs 130 selected by distributor 128. Because the resultant spark timing signal is controllably varied by the present system, the engine crank angle at which the resultant spark timing signal intersects the sawtooth engine crank angle signal will be similarly controllably varied to thereby vary the engine angle at which spark firing occurs. FIG. 2 illustrates graphically an example of this operation. The normal design range may be approximately as shown so that there is some capability for retarded firing relative to engine TDC (top dead center). The range of possible spark ignition may be positioned relative to engine TDC by the fixed timing adjustment. In some instances it may be desirable to limit the maximum advance, and one way of accomplishing this is by a limiter circuit (not shown) for limiting the resultant spark timing signal applied to comparator 122.

Having briefly described the overall operation, attention is now directed toward more detailed consideration of the individual circuits and features.

THROTTLE POSITION TRANSDUCER CIRCUIT 100

Circuit 100 comprises a throttle position transducer 150 including a coil 152 and a core 154. Coil 152 is electrically connected in circuit as a part of an RL one-shot, or monostable, circuit including a resistor 156. Core 154 is operatively coupled with the engine throttle such that the inductance of the transducer will vary as a function of the throttle position between closed and opened positions thereof. The RL one-shot circuit defined by resistor 156 and transducer 150 is caused to undergo an electrical transient by controlled switching of a main control transistor 158. Transistor 158 is periodically triggered into conduction by means of positive triggering pulses 160' supplied from a pulse generator circuit 160. In response to each triggering pulse, the conduction of transistor 158 permits coil 152 to be charged from the B+ supply through resistor 156 and the collector-emitter circuit of transistor 158. In response to the switching of transistor 158 into conduction, the voltage at the junction of coil 152 and resistor 156 decays along an RL time constant determined by the inductance of transducer 150 and the resistance of resistor 156. A feedback circuit 162 is provided to monitor the voltage at the junction of coil 152 and resistor 156 and is used to maintain transistor 158 in conduction until the magnitude of the voltage transient has decayed to a predetermined magnitude at which time conduction of transistor 158 is terminated. The duration for which transistor 158 conducts varies linearly with the inductance of transducer 150. Because the inductance of transducer 150 is a function of throttle position, the duration for which transistor 158 conducts in response to each triggering pulse from pulse generator 160 will be a function of throttle position. By providing a relationship wherein the inductance of transducer 150 diminishes as the throttle is increasingly opened, the duration of conduction of transistor 158 in response to each triggering pulse is in inverse proportion to the amount of throttle opening. An output transistor stage 164 monitors the conductivity of transistor 158 so that stage 164 is conductive when transistor 158 is not, and vice versa. Thus, the duration for which transistor stage 164 is non-conductive is in inverse proportion to the amount of throttle opening. By providing a fixed frequency for trigger pulses 160', as in the present embodiment, it is also true that the duration for which stage 164 is conductive is in direct proportion to the amount of throttle opening.

PULSE TO ANALOG CONVERSION CIRCUIT WITH AMBIENT AIR TEMPERATURE COMPENSATION 102

Circuit 102 comprises a comparator 166, a pair of capacitors 168, 169, a thermistor 170 and a plurality of resistors 172, 174, 176, 178, 179 and 180. Resistors 176, 178 are connected as a voltage divider across the B+ supply to provide a reference signal to the non-inverting input of comparator 166. Illustratively, this reference signal is 20% of the B+ supply voltage. The output stage 164 of circuit 100 is coupled through resistor 174 to the inverting input of comparator 166. Capacitor 168, thermistor 170 and resistor 180 are connected in parallel with each other from the output of comparator 166 to the inverting input of comparator 166. Resistor 172 is connected as a trimming resistor from the positive terminal of the B+ supply to the inverting input of comparator 166. Comparator 166 is a voltage type comparator which provides at its output a controlled impedance path to ground whose impedance is proportional to the voltage differential across its inputs. Hence to produce a usable output signal, the output terminal of comparator 166 connects through pull-up resistor 179 to the positive terminal of the B+ supply. The connection of capacitor 169 between the output terminal of comparator 166 and ground provides unity gain compensation to convert the circuit into an operational amplifier.

Ignoring for a moment the effect of thermistor 170, the operational amplifier circuit in effect averages pulse waveform 134 to develop at line 136 a voltage whose magnitude is representative of the throttle opening. More specifically, the operational amplifier used in circuit 102 averages the conductivity of transistor stage 164, as applied through resistor 174 to the inverting input of the comparator, relative to the reference voltage applied to the non-inverting input. Since it is duration of conductivity of stage 164 which is proportional to throttle opening, values for the illustrated circuit components are selected to yield a frequency response characteristic such that change in the spacing between the individual pulses 134' is accurately tracked and reflected in the magnitude of the signal appearing at line 136. The values of capacitor 168 and resistor 180 are primarily responsible for the frequency response characteristic. The D.C. gain of the circuit is determined primarily by the ratio of resistor 180 to resistor 174, and in the absence of thermistor 170, the gain of the circuit is essentially constant. However, by connecting thermistor 170 as illustrated in the drawing, the D.C. gain of the circuit becomes a function of the resistance of thermistor 170, specifically being determined by the ratio of the parallel combination of resistor 180 and thermistor 170 to resistor 174. By locating thermistor 170 in a suitable location to sense the temperature of ambient air entering the engine for combustion, ambient air temperature compensation is achieved. The gain of the circuit is caused to decrease as temperature sensed by thermistor 170 increases. This has the effect of attenuating the throttle position signal as the temperature of ambient air increases.

FIG. 3 is an example which illustrates the effect of ambient air temperature compensation on the throttle advance signal for a condition where the throttle advance signal is determined solely by the throttle position signal. At 75° F. ambient, the circuit exhibits a characteristic illustrated by curve 182. At 105° F. ambient, the throttle advance signal characteristic is shown by curve 184. By attenuating the throttle advance signal with increasing temperature, improved engine operation is attained. For ambient temperatures below 75° F. the resistance of thermistor 170 becomes sufficiently great that it has essentially negligible effect.

Resistor 172 is adjusted, with the throttle closed, to trim the output at comparator 166 so that it equals the reference signal supplied to the non-inverting input. Since the potential at the inverting input of comparator 166 is inherently virtually equal to that at the non-inverting input, there is no D.C. current flow in thermistor 170 when the throttle is closed. This is advantageous in achieving maximum accuracy since it allows the circuit to be calibrated without the need to know the temperature of thermistor 170.

THROTTLE RATE CIRCUIT 104

Throttle rate circuit 104 comprises two transistor stages. The first stage is composed of a transistor 186, a capacitor 188, a diode 190, and a pair of resistors 192, 194. The second stage consists of a transistor 196, a capacitor 198, and a resistor 200. Normally, transistor 186 is conducting and transistor 196 is non-conducting, and under this condition there is no current flow in line 138. Thus, the throttle rate signal normally gives no advance. Capacitor 188 and resistor 192 determine the frequency response of circuit 104 and hence the capability of the circuit in detecting changes in the throttle position signal at line 136. So long as the signal at line 136 changes relatively slowly in comparison to the response characteristics of resistor 192 and capacitor 188, then the conductivity of transistor 186 remains unaffected; i.e., the transistor remains conductive. However, should there be a change in the signal at the line 136 which is sufficiently fast that the change is not immediately tracked by circuit 104, then transistor 186 is temporarily switched into non-conduction. With transistor 186 non-conducting, transistor 196 is switched into conduction to cause current to be supplied from the B+ supply, through resistor 200, the emitter-collector circuit of transistor 196 and into line 138. Now the throttle rate signal gives a certain amount of advance. In the illustrated embodiment this advance is constant and the duration for which it is given depends upon the rate of change of the throttle position signal. The greater the rate of change of the throttle position signal, the larger the positive pulse which is coupled to capacitor 188 to turn off transistor 186. The larger the pulse applied to turn off transistor 186, the longer the recovery time for the transistor to return to conduction. The longer that the first stage of circuit 104 is conductive, the longer the duration of the throttle rate signal. In passing, it should be noted that diode 190 serves to protect transistor 186 from excessive reverse voltage when the throttle position changes suddenly toward a closed position; also that capacitor 198 is for the purpose of filtering noise.

DEVELOPMENT OF THROTTLE ADVANCE SIGNAL

The throttle advance signal is a function of both the throttle position signal and the throttle rate signal. In the present embodiment the throttle position signal magnitude will normally determine the magnitude of the throttle advance signal. However, when the throttle rate signal is given, the throttle advance signal will be determined by the throttle rate signal, the throttle rate signal in effect overriding the throttle position signal. Thus, with the present embodiment the throttle advance signal will normally be in proportion to the throttle position signal as illustratively shown in FIG. 3; however, when the throttle is opened at a sufficiently fast rate to be detected by throttle rate circuit 104, then maximum throttle advance signal is given, the throttle rate circuit in effect overriding the throttle position signal under this condition. In order to accomplish this manner of operation, output current from line 136 is conducted through an appropriately poled diode 202 and a resistor 204 into line 132. Line 138 is connected to the junction of diode 202 and resistor 204. In this way the two circuits 102 and 104 have their outputs isolated from each other, but the throttle advance signal will be determined by whichever one of the two circuits 102, 104 is producing the larger output. A pull-down resistor 206 is connected from the junction of diode 202 and resistor 204 to ground for the purpose of always keeping diode 202 forward biased so that there is no deadband in the throttle advance signal. Resistor 204 is an advance control resistor which scales the output current into line 132 for scaling the amount of advance commanded by the throttle advance circuit.

ENGINE VACUUM TRANSDUCER CIRCUIT 110

Circuit 110 is almost identical with the throttle position transducer circuit 100. Circuit 110 includes a vacuum transducer 210 which is operatively coupled with the engine intake manifold to sense manifold vacuum and to modulate the inductance of the transducer in accordance therewith. The transducer 210 has its coil electrically connected in an RL type circuit including resistor 212 and transistor 214. Triggering pulses from pulse generator 160 in circuit 100 are also applied to transistor 214 in the engine vacuum transducer circuit 110. Circuit 110 further includes a feedback circuit stage 216 which is like the feedback circuit 162 in circuit 100. Since the conductivity of the feedback circuit is essentially concurrent with the conductivity of transistor 214, the conductivity of the feedback circuit stage is monitored by an output stage 218 to develop the pulse output waveform 140. By making the inductance of transducer 210 decrease as the magnitude of vacuum increases, the width of each pulse 140' increases as the magnitude of vacuum increases.

ACCUMULATION FUNCTION CIRCUIT 108

Circuit 108 includes a rectangular wave generator circuit 220 which generates a rectangular wave signal 222 appearing at line 224. Rectangular wave generator 220 comprises a voltage type comparator 226, a capacitor 228, and a plurality of five resistors 230, 232, 234, 236 and 238. Resistors 236 and 238 are connected across the B+ supply and form a voltage divider supplying a fraction of the B+ supply voltage to the non-inverting input terminal of comparator 226. The output of comparator 226 is connected to resistor 230 which functions as a pull-up resistor to the positive terminal of the B+ supply. Resistor 232 connects from the comparator output terminal to the inverting input terminal of the comparator while resistor 234 connects from the output terminal to the non-inverting input terminal of the comparator. Capacitor 228 connects between the inverting input terminal of comparator 226 and ground. Rectangular wave generator 220 operates in the following fashion. Assuming that capacitor 228 is uncharged, the signal applied to the non-inverting input of comparator 226 from the voltage dividing resistors 236, 238 establishes a voltage differential between the non-inverting and inverting comparator inputs so that the output of the comparator presents a high impedance to ground. Under this condition, charging current is supplied from the B+ supply through resistors 230 and 232 to charge capacitor 228. As capacitor 228 charges, a point is reached where the voltage differential between the non-inverting and the inverting input terminals reverses polarity to cause the output of comparator 226 to become a low impedance to ground. Capacitor 228 now discharges through resistor 232 and the output terminal of comparator 226 to ground. When capacitor 228 has discharged a certain amount, the voltage differential between the comparator inputs reverses thereby causing the output of the comparator to become a high impedance path to ground. Resistor 234 provides a certain hysteresis beneficial to switching. In this way, the rectangular waveform 222 is developed by circuit 220 during steady state operation. By appropriate selection of circuit component values, the waveform 222 is essentially a square wave. (It will be appreciated that with capacitor 228 uncharged, the first half cycle will be longer than usual.)

A counter 239 composed of two 4-bit up-down counters 240 and 242 is connected to square wave generator 220. The two counters 240 and 242 are cascaded together to form an 8-bit up-down counter; however, as will be explained, only the six most significant bits are utilized in the present embodiment. Thus, while counter 239 has the capability of counting a maximum of 255 pulses of square wave 222 (i.e., $2^8 - 1$), the actual counting is accomplished in units of four pulses each so that counter 239, as used herein, can hold a maximum count of sixty-three, (i.e. $2^6 - 1$). The rectangular wave pulses appearing at line 224 are coupled through the parallel combination of a resistor 244 and a capacitor 246 to the clock inputs 240c, 242c of the two counters 240 and 242. The carry-in terminal 242ci of counter 240 is grounded while the carry-in terminal 240ci of counter 242 is connected to the carry-out terminal 240co of counter 240. The preset enable terminals 240pe, 242pe of the two counters 240, 242 are grounded and the two power supply terminals 240ps+, 240ps−, 242ps+, 242ps− for each counter are appropriately connected across the B+ supply. The jam inputs (not shown) are arbitrarily connected to any convenient high or low point; however, they must be connected, rather than floating. The reset terminals 240r, 242r of the two counters are connected through a reset circuit composed of a resistor 248 and a capacitor 250 to the positive terminal of the B+ supply. The up/down terminals 240ud, 242ud are connected, via input circuitry which is connected with switches 146, 148, to control the accumulator circuitry. An R-2R network composed of twelve resistors 252, 254, 256, 258, 260, 262, 264, 266, 268, 270, 272 and 274 is connected with the six binary outputs 240Q3, 240Q4, 242Q1, 242Q2, 242Q3, 242Q4 (in the order of increasing significance) of counter 239 which are utilized. This R-2R network develops the analog accumulation function signal appearing at line 144. The carry-out terminal 242co of counter 242 is connected through a diode 276 back to the clock inputs 240c, 242c of the two counters and a capacitor 278 connects from the carry-out terminal of counter 242 to ground.

Circuit 108 further includes input circuitry which is operatively connected to switches 146, 148. This circuitry includes three resistors 280, 282, 284, a capacitor 286 and a diode 288. Switches 146, 148, which are connected in parallel, are of the grounding type and are adapted to supply a ground on line 290 when either of them is closed. Resistor 280 connects line 290 with the up/down terminals 240ud, 242ud of the counter. Resistor 282 is a pull-up resistor for line 290. With this arrangement of the input circuitry, a ground is applied to line 290 when either switch 146, 148 is closed, and the potential at line 290 is pulled up only when both switches are open. The signal at line 290 is used for two purposes: one, to select the direction in which counter 239 counts; and, two to select one of two frequencies for waveform 222. When the signal at line 290 is pulled up through resistor 282 (i.e. both switches 146, 148 open), counter 239 will count in the up direction, but the signal will have no effect on the frequency of waveform 222. When the signal on line 290 is ground (i.e., either or both switches closed), counter 239 will count in the down direction and the frequency of waveform 222 will be increased. The increase in frequency is caused by the ground signal at line 290 being coupled through resistor 284 and diode 288 to change the fraction of the B+ supply at the non-inverting input of comparator 226. Because of this change, capacitor 228 will charge and discharge over a steeper portion of a negative exponential curve and thereby switch the comparator output at a higher frequency. Thus, from the foregoing, it will be appreciated that counter 239 counts up at a slower rate than the rate at which it counts down.

In operation, counter 239 counts the positive-going leading edges of the positive pulses of waveform 222. The pulses are coupled via resistor 244 and capacitor 246 to both clock inputs 240c, 242c of the individual counters 240, 242. Resistor 244 substantially minimizes, or eliminates entirely, any dither while capacitor 246 is basically a speed-up coupling capacitor. When counter 239 contains a zero decimal count, a ground signal (representing a binary zero) is present at each binary output 240Q3, 240Q4, 242Q1, 242Q2, 242Q3, 242Q4. Assuming that both switches 146, 148 are open, counter 239 will begin to count up, advancing one unit for every four leading edges of waveform 222. Counter 239 counts up in binary fashion with a binary zero at a binary output terminal being represented by a ground and a binary one being represented by a B+ signal. The R-2R network which is connected with the six output bits of the counter develops at line 144 an analog signal whose magnitude is representative of the value of the count in counter 239. Thus, the signal at line 144 will be a voltage which becomes progressively more positive as the count advances upwardly, the signal having sixty-three increments. It will also be noted that the rate at which the counter counts up is at a selected counting-up frequency and by way of example this may be 0.5 hertz. When a binary one is present at each of the eight output bits of the two counters, 240, 242 (including the two bits of counter 240 which are not utilized), a signal appears at the carry-out terminal 240co of counter 242 which is coupled back via diode 276 to both clock inputs 240c, 242c of the two individual counters. This signal in effect latches the counter so that further positive-going transitions in waveform 222 are prevented from advancing the count. (It will be appreciated that in the absence of such a latch circuit, were one more positive-going transition of rectangular wave 222 applied to the counter, the counter output would return to zero.) With the counter latched in this manner the accumulation function is maintained at maximum value. Capacitor 278 is beneficial in attaining best operation of the circuit.

When either switch 146 or switch 148 closes, counter 239 will begin to count down with the count down rate exceeding the count up rate, for example, being at one hertz. When a ground is applied to line 290, the counter is released from its latched condition, and now positive-going transitions in waveform 222 will cause the counter to begin counting down one bit per every four positive-going transitions of waveform 222. In this way, the accumulation function signal will diminish over sixty-three increments until the count in counter 239 has returned to zero. When the count returns to zero, further positive transitions in waveform 222 have no effect on the counter since the latch circuit works in both directions.

Whenever the power is initially turned on, the counter is reset to zero by the reset circuit including resistor 248 and capacitor 250 which serves to couple a reset pulse to the two individual counters 240, 242.

MODULATION CIRCUIT 112

Modulation circuit 112 comprises an input emitter-follower stage which receives the analog accumulation function signal via line 144 and the output signal 140 of engine vacuum transducer circuit 110 via line 142. This emitter-follower stage comprises an NPN transistor 292 and a plurality of three resistors 294, 296 and 300. Line 144 connects to the base of transistor 292. The collector of transistor 292 connects directly to the positive terminal of the B+ supply and resistors 294, 296 connect in series between the emitter of transistor 292 and ground. Resistor 300 shunts the collector-emitter circuit of transistor 292. Assuming for the moment that transistor 292 is non-conductive, the voltage at line 293 which is at the emitter of transistor 292, will be a selected fraction of the B+ supply as determined by the ratio of the sum of resistors 294 and 296 to the sum of resistors 294, 296 and 300. As the potential at the base of transistor 292 is now progressively made increasingly positive, then the potential at line 293 will follow the potential at the base once the base potential has become large enough to forward bias the base-emitter junction of the transistor. Thus it may be stated that once the magnitude of the accumulation function reaches a certain threshold, the magnitude of the signal at line 293 thereafter also will track magnitudes of the accumulation function which exceed the threshold. The signal at line 295 will track the signal at the emitter of transistor 292 but at a magnitude which is attenuated by the voltage dividing effect of resistors 294, 296.

These two signals, namely, the signal at line 293 and the signal at line 295, are used in conjunction with the signal from vacuum transducer circuit 110 to develop the programmed vacuum advance signal. These three signals are supplied as inputs to another stage of circuit 112 which comprises a comparator 302, a plurality of seven resistors, 298, 303, 304, 306, 308, 310, 318 and a plurality of three capacitors 312, 314 and 316. Comparator 302 is a device like comparator 226 and the circuit is converted into an operational amplifier configuration by connecting capacitor 316 from the output terminal of the comparator to ground and connecting resistor 310 as a pull-up resistor for the comparator output to the B+ supply. Line 295 is coupled through resistor 303 to the inverting input of comparator 302 while line 293 is connected through resistor 298 and resistor 304 to the non-inverting input of comparator 302. The collector of the transistor in stage 218 connects to the junction of resistors 298 and 304. Resistor 308 and capacitor 312 connect in parallel from the non-inverting input of the comparator to ground, and resistor 306 and capacitor 314 connect from the output to the inverting input of the comparator. The input circuit associated with the non-inverting input of comparator 302 will tend to create a signal input to the comparator which is representative of the average of pulse waveform 140. Since the average of pulse waveform 140 is a function not only of the pulse width but also the pulse amplitude by virtue of the connection of line 293 to line 142 through resistor 298, the average of pulse waveform 140 is a function not only of the duration for which transistor stage 218 is non-conductive but also of the value of the accumulation function signal. Thus, the average of signal 140 will increase as the non-conductivity of transistor 218 increases and will also increase as the magnitude of the accumulation function signal increases once the base-emitter of transistor 292 has been forward biased for conduction. Therefore, once transistor 292 begins to conduct the average of waveform 140 is equal to the product of the two. As the average of waveform 140 increases, the programmed vacuum advance signal similarly increases.

The connection of line 295 to the inverting input of comparator 302 causes the programmed vacuum advance signal to be adjusted in proportion to the magnitude of the accumulation function signal. More specifically, there is subtracted from the output of the comparator which would otherwise occur, a signal whose magnitude is proportional to the signal at line 295 which, as will be recalled is an attenuated version of the signal appearing at line 293 from which the pulse waveform 140 is in part developed. The reason for subtracting this signal is that when there is a condition of zero vacuum, the pulse waveform 140 will have a predetermined minimum pulse width for each pulse 140'. In effect then, this subtraction automatically subtracts this minimum initial pulse width of each pulse so that the actual programmed vacuum advance signal will be in proportion to the true magnitude of vacuum signal. In this way the programmed vacuum advance signal is made essentially directly proportional to the magnitude of intake manifold vacuum for a given positive voltage at line 293; also, as explained above, the programmed vacuum advance signal is made representative of the voltage at line 293 for any given magnitude of intake manifold vacuum. Thus, with transistor 292 conducting the voltage signal appearing at the output of comparator 302 is representative of the product of the magnitude of engine vacuum and the value of the accumulation function and the programmed vacuum advance signal is supplied as current flow from circuit 112 through the output resistor 318 into sum line 132.

VACUUM ADVANCE INHIBIT CIRCUIT 116

This circuit is provided to cancel the programmed vacuum advance signal when an engine idle condition exists. Therefore, the circuit is operatively coupled with the idle stop switch 148 by line 290. Circuit 116 is basically a single transistor stage which, when a ground is present at line 290, drives sufficient current into the inverting input of comparator 302 to drive the comparator output voltage to ground. Circuit 116 comprises a PNP transistor 320 and a plurality of four resistors 322, 324, 326 and 328. Resistors 324 and 326 connect in series from line 290 to the base of transistor 320. The emitter of transistor 320 connects directly to the positive terminal of the B+ supply and the collector connects through resistor 328 to the inverting input of comparator 302. Resistor 322 connects between the emitter and base of transistor 320. Whenever the signal at line 290 is pulled up, the transistor 320 is non-conductive and the circuit has essentially no influence on modulation circuit 112. However, when a ground is applied at line 290, then transistor 320 is driven into conduction to cause current to be supplied through the emitter-collector circuit thereof and resistor 328 to the non-inverting input of comparator 302 and as mentioned this has the effect of driving the comparator such that the programmed vacuum advance signal is reduced to zero magnitude irrespective of the advance otherwise commanded by accumulation function circuit 108 and engine vacuum transducer circuit 110. Whenever the ground is removed from line 290, the programmed vacuum advance signal is again established by the accumulation function circuit and the engine vacuum transducer circuit.

BREAK IDLE ADVANCE CIRCUIT 114

This circuit is responsive to the disappearance of a ground on line 290 and comprises an input circuit composed of a pair of capacitors 330, 332 and a pair of resistors 334, 336, these four circuit components forming an input to the base of a transistor 338. The collector of transistor 338 connects to the positive terminal of the B+ supply and the emitter connects through a resistor 340 to sum line 132. Capacitor 330 connects from line 290 to ground. Capacitor 332 and resistor 336 connect in series with each other from line 290 to the base of transistor 338 while resistor 334 connects from the junction of capacitor 332 and resistor 336 to ground. Normally, transistor 338 is non-conductive and, therefore, provides no current output through resistor 340 into sum line 132. When the potential at line 290 is of positive polarity relative to ground, both capacitors 330 and 332 are similarly positively charged to the illustrated polarity thereby precluding current flow into the base of transistor 338. When the signal at line 290 switches from high to ground, both capacitors 330, 332 discharge; however, transistor 338 remains non-conductive. Whenever line 290 next goes high, a positive pulse is coupled through capacitor 332 thereby providing base drive for transistor 338 and causing transistor 338 to conduct current through resistor 340 into sum line 132. The duration for which transistor 338 will continue to conduct depends upon the time constant associated with the input circuit and is primarily determined by the values of capacitor 332 and resistor 334. Thus, whenever the signal at line 290 switches from ground to high, the break-idle advance signal is given, providing extra advance to the ignition spark timing. As will be explained in greater detail hereinafter this circuit functions primarily to provide extra advance when the engine is accelerated from idle.

ENGINE START ADVANCE CIRCUIT 118

Circuit 118 comprises a plurality of five resistors, 342, 344, 346, 348 and 350, two transistors 352, 354, and a capacitor 356 connected as illustrated. Resistors 342 and 344 form a voltage divider connecting the ignition switch start contacts to the base terminal of transistor 352 which is of the NPN type. The ignition switch start contacts are in turn connected to the vehicle battery so that when the ignition switch is operated to the start position, transistor 352 is caused to conduct. Once the engine has started and the start contacts are released, transistor 352 does not conduct. The emitter of transistor 352 is grounded and the collector connects through load resistor 346 to the positive terminal of the B+ supply. Capacitor 356 shunts resistor 346, the two forming a collector load for transistor 352. Resistor 348 serves to connect the emitter of transistor 354, which is of the PNP type, to the B+ supply while resistor 350 connects the base of transistor 354 to the collector of transistor 352. The collector of transistor 354 connects to sum line 132.

With transistor 352 normally not conducting, transistor 354 likewise is non-conducting. However, when transistor 352 conducts, its collector voltage is greatly reduced to thereby permit transistor 354 to conduct and at the same time capacitor 356 to be charged to almost the full magnitude of the B+ supply. When transistor 352 ceases to conduct, charge on capacitor 356 is gradually dissipated, principally through resistors 348 and 350 thereby maintaining transistor 354 in a conductive condition for a certain time interval after transistor 352 has ceased conducting. In this way current continues to flow from the B+ supply, through resistor 348, through the emitter-collector circuit of transistor 354 and into sum line 132 for a predetermined interval. As the charge on capacitor 356 is dissipated, the current in transistor 354 similarly progressively diminishes and the resultant input to sum line 132 also gradually diminishes. FIG. 8 illustrates a possible characteristic 380 of the current which forms the start advance signal from circuit 118. As can be seen, the circuit characteristics may be selected to provide a constant advance for a short time interval after the ignition switch contacts have opened which thereafter progressively decays to zero. Alternatively, the characteristics of the circuit could be selected to provide an advance characteristic 382 which essentially immediately begins to progressively decrease toward zero as soon as the start contacts are released.

The present circuit provides a mode of engine operation which has been found to be especially beneficial during starting and warm-up of the engine. By providing extra advance as the engine begins to run, and by usig a leaner fuel-air mixture, it has been found that the engine can be efficiently warmed up while at the same time providing improved vehicle driveability during this time.

DESCRIPTION OF FIGS. 3 THROUGH 8

As discussed above, FIG. 3 illustrates two graph plots 182, 184 which typically illustrate the amount of spark timing advance as a function of throttle position under two different ambient temperature conditions. It will be appreciated that for different ambient temperatures there exists a family of similar graph plots which illustrate the attenuation of the throttle advance signal for increasing ambient temperature. The curvature in the two illustrated graph plots 182, 184 is created by a particular linkage connection of the throttle position transducer 150 with the engine throttle. The illustrated circuitry is itself substantially linear. For a given ambient temperature the maximum magnitude of the throttle advance signal, for a condition where the throttle advance signal is determined solely by the throttle position signal, is determined by the value of resistor 179. By making resistor 200 in throttle rate circuit 104 equal to resistor 179, the same maximum throttle advance signal is given when the throttle rate circuit overrides the throttle position circuit so that the throttle advance signal is transiently determined solely by the throttle rate signal. It will be further noted that because the throttle rate signal is derived from the temperature compensated throttle position signal, the throttle rate signal is itself temperature compensated. The basic concept of providing a throttle signal used for the purpose of controlling engine spark timing, and the ancillary concepts reflected in the specific manner in which the disclosed throttle advance signal is developed, provide improved driveability in an engine-driven vehicle.

FIGS. 4 and 5 should be considered together since both relate to the development of the programmed vacuum advance signal. FIG. 4 illustrates a family of graph plots of the magnitude of the programmed vacuum advance signal as a function of time for different magnitudes of engine manifold vacuum. Graph plot 360 illustrates the function for manifold vacuum equal to 13 inches of mercury (Hg.); graph plot 362, for a vacuum equal to 11 inches of mercury; graph plot 364, for a vacuum equal to 10 inches of mercury; graph plot 366, for a vacuum equal to 8 inches mercury; graph plot 368, for a vacuum equal to three inches mercury. The five representative graph plots 360 – 368 are for a condition where accumulation function circuit 108 is counting in the up direction from an initial count of zero to its maximum count. Thus, each of the graph plots 360 – 368 is of a staircase form. It will be observed that all graph plots 360 – 368 begin at a time equal to 50 seconds after the accumulation function circuit 108 has begun to accumulate counts. The reason for this is that the voltage across the base-emitter terminals of transistor 292 in modulation circuit 112 must overcome the PN junction characteristic before the potential at line 293 can begin to rise, as explained above. Thus, once the base-emitter junction of transistor 292 becomes forward biased, then further increments in the count in accumulation function circuit 108 are directly reflected in the increase in the vacuum advance signal. Thus, each of the staircase graph plots 360 – 368 will contain a number of increments somewhat less than the 63 increments which are provided by accumulation function circuit 108. Because accumulation function circuit 108 counts up to a constant frequency, increments in the graph plots 360 – 368 will always occur at the same point in time independently of the magnitude of engine vacuum. However, the magnitude of each increment will depend upon the magnitude of engine vacuum, the magnitude of the increment increasing as the magnitude of vacuum increases. Thus, the graph plots illustrate that maximum vacuum advance signal is reached earlier in time as the magnitude of manifold vacuum increases above the 10 inches of mercury level. For magnitudes of engine vacuum less than 10 inches mercury, the vacuum advance signal does not reach its maximum possible limit of +32° after the maximum count in accumulation function circuit 108 has been reached. Thus, the graph plots 366 and 368 do not increase further after the maximum count in accumulation function circuit 108 has been reached (the maximum count being reached after 300 seconds as illustrively shown). It should also be explained that the illustrated graph plots 360 – 368 are for a condition where the magnitude of resistor 300 is very large, or the resistor is omitted entirely from the circuit. By reducing the resistance of resistor 300, the potential at line 293, for a condition where transistor 292 is not conducting, will increase. This can be used to provide an initial programmed vacuum advance plot, like those shown in FIG. 5, until transistor 292 is forward biased. It should also be appreciated that when accumulation function circuit 108 is counting down, the vacuum advance signal decreases at twice the rate at which it increases because the counting rate at which the accumulation function circuit 108 counts down is doubled.

FIG. 5 illustrates a family of graph plots 370, 372, 374 and 376 each of which shows the vacuum advance signal as a function of manifold vacuum for a given count contained in accumulation function circuit 108. The graph plot 370, labelled full accumulator, illustrates a condition where the maximum count in accumulation function circuit 108 has forced the emitter voltage of transistor 292 to its maximum; graph plot 372, labeled one-half full, a condition where the count has forced the emitter voltage to one-half maximum, graph plot 374 labeled one-quarter full, a condition where the count has forced the emitter voltage to one-quarter maximum; and graph plot 376, labeled empty, a condition where the emitter voltage is at a minimum.

FIG. 6 illustrates the theory on which modulation circuit 112 operates as described above. For a manifold vacuum of zero inches mercury each pulse in waveform 140 has a certain width $W_o$; this is illustrated by the shaded portion of FIG. 6. As the magnitude of manifold vacuum increases the width of each pulse increases by an amount $\Delta W$ which is directly proportional to the magnitude of manifold vacuum as supplied from engine vacuum transducer circuit 110. Thus, in order to obtain the true magnitude of engine vacuum, for use in modulation circuit 112 to develop the programmed vacuum advance signal, it is necessary to subtract the shaded portion $W_o$ from the width of each pulse so that a measurement of the $\Delta W$ can be obtained. Modulation circuit 112 accomplishes this objective in the manner described above. The amplitude is representative of the count contained in accumulation function circuit 108 and represents the accumulator level. Thus, it is the area of the unshaded portion of the pulse in FIG. 6 which represents the product of the accumulation function and the magnitude of manifold vacuum.

FIG. 7 illustrates a graph plot 378 which is an example of the speed advance signal as a function of engine speed.

FIG. 8 illustrates a graph plot 380 showing the development of the start advance signal provided by start advance circuit 118. Graph plot 380 illustrates a design wherein the start advance signal remains constant for a certain time interval after the ignition switch start contacts have opened and thereafter progressively decays to ultimately provide no advance.

OPERATION OF THE SYSTEM IN AN AUTOMOTIVE VEHICLE

In an automotive vehicle the various features of the invention, both singly and in combination contribute to an improved vehicle performance.

The provision of the throttle advance signal according to principles of the invention is beneficial in avoiding engine knock at high ambient air temperatures. Because the combustion process becomes hotter as the temperature of ambient air used in the combustion process rises, it has been found desirable to attenuate the effect of the throttle advance signal on the engine spark timing as the temperature of the ambient air increases. The feature of providing the throttle rate signal to override the throttle position signal is beneficial in providing improved response of the vehicle to operator commanded acceleration.

The development of the programmed vacuum advance signal permits the attainment of desired modes of engine operation depending upon the type of driving to which the vehicle is being subjected. For example, the system may be considered as providing one program for city type driving and another program for country type driving. Each of these two programs adapts the engine to a desired mode of operation for each condition. The engine coolant temperature switch 146 prevents the accumulation function circuit 108 from accumulating any count until the engine has warmed up; thus the spark timing is incapable of being advanced by engine manifold vacuum until the engine has warmed up. Once the engine has warmed up however, the accumulation function circuit is controlled by the idle stop switch. Where the vehicle is being driven under conditions which require frequent operation at idle (for example city driving conditions) the idle stop switch will be frequently closed. Thus the count in accumulation function circuit 108 would generally fluctuate over a very low range of values; and, therefore, the magnitude of the programmed vacuum advance signal will fluctuate over a similar low range of magnitudes even though the actual magnitude of engine vacuum may become rather high at times. In general then, when the vehicle is being operated in a city driving condition the average spark timing advance due to engine manifold vacuum will remain relatively small. This is desirable in reducing the level of exhaust emissions from the vehicle. The vacuum advance inhibit circuit always cancels the programmed vacuum advance signal when the engine idle stop switch closes.

When the vehicle is being driven on the highway, the idle stop switch will remain open for extended periods of time thereby permitting maximum count to be accumulated by accumulation function circuit 108. Under this condition the full effect of the engine vacuum signal is obtained. This is advantageous in achieving better fuel economy. Thus, it can be seen that the provision of the programmed vacuum advance signal provides a capability for obtaining both reduced emissions levels and at the same time obtaining better fuel economy.

The provision of the break-idle advance signal is advantageous in achieving better responsiveness of the vehicle to operator commanded accelerations from idle. By way of example, the signal may provide 3 to 5 degrees of advance for one-half second.

The provision of the start advance signal is essentially for starting under cold start conditions and hot soak conditions. Under a cold start condition the engine receives a richer fuel mixture which tends to be slower burning. Therefore it is desirable to provide a slightly increased advance during the early running of the engine after starting. Under a hot soak condition the fuel is hotter, the choke is inactive and the fuel mixture tends to be leaner than normal. This gives rise to a slow burning condition and it is also desirable to provide more advance during the early running of the engine after starting.

Thus, the invention provides a system which achieves substantial improvement and advantages over prior systems. It should be appreciated that the values and examples described in the preferred embodiment represent an illustrative system and are not intended to limit the scope of the invention. It is fully contemplated that different engine designs will require different amounts of advance and different calibration of the individual circuits used in a system embodying the principles of the invention. With the improved control afforded by the present invention, the possibility of higher compression ratios and leaner fuel mixtures is made attainable. As a further improvement on the system, thermal feedback can be provided whereby the temperature of the engine exhaust is monitored and is used to retard the spark timing when the temperature is low and to advance the spark timing when the temperature increases. By this mode of operation, the engine is warmed up more rapidly and improved fuel economy is obtained once the engine is warmed up. Such a system includes a fast-response thermocouple which monitors the exhaust temperature and controls both the speed advance and the throttle advance signals. Furthermore, the system can be further improved by monitoring each individual cylinder and using this information to adjust the spark timing.

The circuits disclosed herein can be constructed from conventional, commercially available circuit components and on the basis of the present disclosure specific values for said components can be selected using well known design techniques. By way of example, the four bit up-down counters 240, 242 can be Motorola Model No. MC 14516CP and the comparators can be National Semiconductor Model LM 2901. A suitable regulated power supply for supplying the B+ potential to the electronic circuitry is also provided although not shown in detail in the drawings. The regulated power supply may be of any conventional design to provide adequate regulation of the supply voltage to the electronic circuits. In the present system the regulated power supply is preferably energized from the "on" contact of the conventional ignition switch. As another design for accumulation function circuit 108 it is contemplated that the coolant temperature switch, rather than being connected in parallel with the idle stop switch, could be connected with the wave generator circuit 220 so that the waveform 222 is generated only when the engine has reached running temperature.

It should be mentioned that the idle stop switch is preferably mounted so as to sense when the throttle has been released by the vehicle operator. Thus it will be appreciated that when the vehicle is running at high speed, and the throttle is suddenly released, the idle stop switch will close sometime before the engine has decelerated to idle speed. Where the engine idle speed is controlled in accordance with the engine temperature, for example by the usual hot/cold idle control arrangement, the mounting of idle stop switch to sense release of the throttle by the operator will insure that switch actuation is independent of the engine idle speed as controlled by the usual hot/cold idle arrangement.

In order to protect the engine from overheating at idle or relatively low speed operation on extremely hot days, it is desireable to cause the engine to run at a higher speed than it otherwise would by using an additional circuit associated with the vacuum advance program circuit 106. This additional circuit would include a temperature responsive switch responsive to very high coolant temperatures to cause, via an electronic circuit, full vacuum advance to be given irrespective of the value of the count contained in the accumulation function circuit 108. This electronic circuit would operatively connect the temperature responsive switch with the output of accumulation function circuit 108 and would operate to override the existing accumulation function signal when a high coolant temperature is detected by the temperature responsive switch. By causing full advance to be given, the engine will tend to run at a higher speed and the usual engine fan will tend to draw more cooling air through the radiator thereby correcting the high temperature condition.

In order to start the engine it is preferable to use a separate start pickup for causing spark firing at a predetermined engine crank angle. Once the engine has started the start pickup is disconnected and the present system assumes control of the spark timing.

What is claimed is:

1. In an internal combustion engine having throttle control means for controlling throttle position and having a spark ignition system including spark timing control means for controlling the engine angle at which spark ignition occurs relative to a fixed engine angle, the improvement comprising:
   means for generating a throttle advance signal representative of throttle operation including,
   transducer means directly connected to and operable by said throttle control means to provide a transducer output signal representative of throttle position,
   means operatively coupled with said transducer means for generating from said transducer output signal said throttle advance signal as a function of both throttle position and rate of change of throttle position, and
   means for supplying said throttle advance signal to said spark timing control means.

2. The improvement according to claim 1 wherein said means for generating said throttle advance signal includes means for causing the rate of change of throttle position to override the throttle position under certain conditions.

3. The improvement according to claim 1 wherein the rate of change of throttle position contributes to said throttle advance signal only in response to increases in the amount of throttle opening.

4. The improvement according to claim 1 including means for sensing the temperature of ambient air entering the engine for combustion and means for temperature compensating said throttle advance signal in accordance with the sensed temperature of ambient air.

5. The improvement according to claim 1 including further means for generating an additional advance signal when the engine throttle is opened from the idle position.

6. In an internal combustion engine having throttle control means for controlling throttle position and having a spark ignition system including spark timing control means for controlling the engine angle at which spark ignition occurs relative to a fixed engine angle, the improvement comprising:
   means for generating a throttle advance signal representative of throttle operation including,
   transducer means directly connected to and operable by said throttle control means to provide a transducer output signal representative of throttle position,
   means operatively coupled with said transducer means for generating from said transducer output signal said throttle advance signal as a function of both throttle position and rate of change of throttle position, and
   means for supplying said throttle advance signal to said spark timing control means;
   including further means for generating an additional advance signal when the throttle is opened from the idle position, and
   including means for sensing the temperature of ambient air entering the engine for combustion and means for temperature compensating said throttle advance signal in accordance with the sensed temperature of ambient air.

7. For an internal combustion engine an improved spark timing control system, comprising: means for providing a throttle advance signal derived from throttle operation; means for providing a vacuum advance signal derived from engine manifold vacuum; means for providing a break-idle advance signal in response to engine acceleration from idle; means for providing a start advance signal for a predetermined time interval once the engine has been started; means for providing an engine speed advance signal representative of engine speed; means for providing a fixed timing signal representative of fixed engine timing; means for algebraically summing said signals together to form a resultant spark timing signal; and means for causing the time of spark firing to be controlled by said resultant spark timing signal; and wherein said throttle advance signal is a function of throttle position, rate of change of throttle position and the temperature of ambient air entering the engine for combustion.

8. For an internal combustion engine having a spark ignition system including a spark timing control means for controlling the engine angle at which spark ignition occurs relative to a fixed engine angle, the improvement comprising:
   accumulation function generating means for generating an accumulation function representative of the duration of engine operation in selected operating modes to provide a time accumulation function signal which progressively increases with time when the engine is operating in one selected operating mode during running operation of the engine and which progressively decreases with time when the engine is operating in another selected operating mode during running operation of the engine;
   sensing means for sensing the value of an engine operating parameter and for generating a control signal having a value representative of the value of said parameter;
   modifying means for modifying the value of said control signal by said accumulation function signal to develop a modified control signal;
   and means for supplying said modified control signal to said spark timing control means.

9. The improvement according to claim 8 wherein said accumulation function generating means includes means for limiting both maximally and minimally the value of the accumulation function signal.

10. The improvement according to claim 8 wherein said accumulation function generating means comprises means for generating said accumulation function such that said time accumulation function signal increases when the engine is running in the non-idle mode and decreases when the engine is running in the idle mode.

11. The improvement according to claim 10 wherein said modifying means comprises means for multiplying the value of said control signal by the value of said time accumulation function signal to develop said modified control signal.

12. The improvement according to claim 11 further including override means for overriding said time accumulation function signal when the engine is running in the idle mode.

13. The improvement according to claim 11 wherein said accumulation function generating means comprises means responsive to engine operating temperature for enabling said accumulation function generating means to be operative in generating said time accumulation function signal only when the engine operating temperature is above a predetermined temperature.

14. The improvement according to claim 13 further including override means for overriding said time accumulation function signal when the engine is running in the idle mode.

15. The improvement according to claim 10 wherein said accumulation function generating means comprises means responsive to engine operating temperature for enabling said accumulation function generating means to be operative in generating said time accumulation function signal only when the engine operating temperature is above a predetermined temperature.

16. The improvement according to claim 15 further including override means for overriding of said time accumulation function signal when the engine is running in the idle mode.

17. The improvement according to claim 10 further including override means for overriding said time accumulation function signal when the engine is running in the idle mode.

18. The improvement according to claim 8 wherein said modifying means comprises means for multiplying the value of said control signal by the value of said time accumulation function signal to develop said modified control signal.

19. The improvement according to claim 18 wherein said accumulation function generating means comprises means responsive to engine operating temperature for enabling said accumulation function generating means to be operative in generating said time accumulation function signal only when the engine operating temperature is above a predetermined temperature.

20. The improvement according to claim 19 further including override means for overriding said time accumulation function signal when the engine is running in the idle mode.

21. The improvement according to claim 18 further including override means for overriding said time accumulation function signal when the engine is running in the idle mode.

22. The improvement according to claim 8 wherein said accumulation function generating means comprises means responsive to engine operating temperature for enabling said accumulation function generating means to be operative in generating said time accumulation function signal only when the engine operating temperature is above a predetermined temperature.

23. The improvement according to claim 22 further including override means for overriding said time accumulation function signal when the engine is running in the idle mode.

24. The improvement according to claim 8 further including override means for overriding said time accumulation function signal when the engine is running in the idle mode.

25. The improvement according to claim 24 wherein said override means comprises means for cancelling said time accumulation function signal when the engine is running in the idle mode.

26. The improvement according to claim 8 wherein said two selected operating modes are engine idle and engine non-idle.

27. The improvement according to claim 26 wherein said accumulation function generating means comprises means for causing said time accumulation function signal to progressively increase with time when the engine is operating in the non-idle mode and to progressively decrease with time when the engine is operating in the idle mode.

28. The improvement according to claim 27 wherein said accumulation function generating means includes means for limiting both maximally and minimally the value of the time accumulation function signal.

29. The improvement according to claim 8 further including override means for cancelling the time accumulation function signal under a selected engine operating condition.

30. The improvement according to claim 29 wherein said selected engine operating condition is engine idle.

31. The improvement according to claim 8 wherein said accumulation function generating means comprises means for generating said accumulation function such that said time accumulation function signal progressively increases with time at a constant rate.

32. The improvement according to claim 31 wherein said time accumulation function signal progressively increases with time at a constant rate in discrete increments.

33. The improvement according to claim 8 wherein said accumulation function generating means comprises means for generating said accumulation function such that said time accumulation function signal progressively decreases with time at a constant rate.

34. The improvement according to claim 33 wherein said time accumulation function signal progressively decreases at a constant rate in discrete increments.

35. The improvement according to claim 8 wherein said accumulation function generating means comprises means for generating said accumulation function such that said time accumulation function signal progressively increases with time at one rate when the engine is operating in one selected operating mode during running operation of the engine and progressively decreases with time at another rate when the engine is operating in another selected operating mode during running operation of the engine, said rate of decrease being different from said rate of increase, and including limiting means for limiting both maximally and minimally the value of the time accumulation function signal to within a given range.

36. The improvement according to claim 35 wherein said one selected operating mode is engine non-idle and said another selected operating mode is engine idle.

37. The improvement according to claim 36 wherein said sensing means comprises means for sensing the value of engine manifold vacuum and for generating said control signal in accordance with the value of said vacuum.

38. The improvement according to claim 37 wherein said accumulation function generating means comprises means responsive to engine operating temperature for enabling said accumulation function generating means to be operative only when the engine operating temperature is above a predetermined temperature.

39. The improvement according to claim 37 wherein said modifying means comprises means for multiplying the value of said control signal by the value of said time accumulation function signal.

40. The improvement according to claim 8 wherein said sensing means comprises means for sensing the value of the engine manifold vacuum and for generating said control signal in accordance with the value of said vacuum.

41. For an internal combustion engine having a spark ignition system including a spark timing control means for controlling the engine angle at which spark ignition occurs relative to a fixed engine angle, the improvement comprising:
accumulation function generating means for generating an accumulation function representative of the duration of engine operation in selected operating modes;
sensing means for sensing the value of an engine operating parameter and for generating a control signal having a value representative of the value of said parameter;
modifying means for modifying the value of said control signal by said accumulation function to develop a modified control signal;
and means for supplying said modified control signal to said spark timing control means;
wherein said accumulation function generating means comprises means for generating said accumulation function in accordance with the duration for which the engine has been operating in idle and non-idle modes.

42. For an internal combustion engine having a spark ignition system including a spark timing control means for controlling th engine angle at which spark ignition occurs relative to a fixed engine angle, the improvement comprising:
accumulation function generating means for generating an accumulation function representative of the duration of engine operation in selected operating modes;
sensing means for sensing the value of an engine operating parameter and for generating a control signal having a value representative of the value of said parameter;
modifying means for modifying the value of said control signal by said accumulation function to develop a modified control signal;
and means for supplying said modified control signal to said spark timing control means;
wherein said modifying means comprises means for multiplying the value of said control signal by the value of said accumulation function.

43. For an internal combustion engine having a spark ignition system including a spark timing control means for controlling the engine angle at which spark ignition occurs relative to a fixed engine angle, the improvement comprising:
accumulation function generating means for generating an accumulation function representative of the duration of engine operation in selected operating modes;
sensing means for sensing the value of an engine operating parameter and for generating a control signal having a value representative of the value of said parameter;
modifying means for modifying the value of said control signal by said accumulation function to develop a modified control signal;
and means for supplying said modified control signal to said spark timing control means;
wherein said accumulation function generating means comprises means responsive to engine operating temperature for enabling said accumulation function generating means to be operative only when the engine operating temperature is above a predetermined temperature.

44. For an internal combustion engine having a spark ignition system including a spark timing control means for controlling the engine angle at which spark ignition occurs relative to a fixed engine angle, the improvement comprising:
accumulation function generating means for generating an accumulation function representative of the duration of engine operation in selected operating modes;

sensing means for sensing the value of an engine operating parameter and for generating a control signal having a value representative of the value of said parameter;

modifying means for modifying the value of said control signal by said accumulation function to develop a modified control signal;

and means for supplying said modified control signal to said spark timing control means;

further including override means for overriding said accumulation function when the engine is in idle.

45. In an engine having a utilization system which utilizes a control signal for controlling engine operation, the improvement comprising:

time accumulation function generating means for generating a time accumulation function by progressively increasing the magnitude of a time accumulation function signal when the engine is running in one selected condition and by progressively decreasing the magnitude of said time accumulation function signal when the engine is running in another selected condition different from said one selected condition;

switch means operative to a first state when the engine is running in said one selected condition and to a second state when the engine is running in said another selected condition;

means operatively coupling said switch means and said time accumulation function generating means such that the time accumulation function signal increases in magnitude when said switch means is in said first state and decreases in magnitude when said switch means is in said second state;

sensing means for sensing the value of an engine operating parameter and for generating an output signal having a value representative of the value of said parameter;

modifying means for modifying the value of said output signal by the value of said time accumulation function signal to thus develop said control signal and means for supplying said control signal to said utilization means.

46. The improvement according to claim 45 wherein said sensing means comprises means for sensing the value of engine manifold vacuum and for generating said output signal in accordance with the value of said vacuum.

47. In an engine having a utilization system which utilizes a control signal for controlling engine operation, the improvement comprising:

accumulation function generating means for generating an accumulation function;

switch means responsive to an engine operating condition;

means operatively coupling said switch means and said accumulation function generating means such that the accumulation function increases in magnitude when said switch means is in one condition and decreases in magnitude when said switch means is in another condition;

sensing means for sensing the value of an engine operating parameter and for generating an output signal having a value representative of the value of said parameter;

modifying means for modifying the value of said output signal by the value of said accumulation function to thus develop said control signal; and means for supplying said control signal to said utilization means;

wherein said switch means comprises a switch which senses engine idle and non-idle conditions.

48. In an engine having a utilization system which utilizes a control signal for controlling engine operation, the improvement comprising:

accumulation function generating means for generating an accumulation function;

switch means responsive to an engine operating condition;

means operatively coupling said switch means and said accumulation function generating means such that the accumulation function increases in magnitude when said switch means is in one condition and decreases in magnitude when said switch means is in another condition;

sensing means for sensing the value of an engine operating parameter and for generating an output signal having a value representative of the value of said parameter;

modifying means for modifying the value of said output signal by the value of said accumulation function to thus develop said control signal; and means for supplying said control signal to said utilization means; and further including engine temperature responsive switch means operatively coupled with said accumulation function generating means for enabling said accumulation function generating means to operate only when said engine temperature responsive switch means senses a predetermined temperature of the engine.

49. The improvement according to claim 45 wherein said utilization means comprises a spark timing control means.

50. The improvement according to claim 12 wherein said time accumulation function generating means includes means for limiting maximally and minimally the value of said time accumulation function signal.

51. In an engine control system the improvement comprising:

means operative to a first state when the engine is running in one selected condition and to a second state when the engine is running in another selected condition different from said first condition;

means operatively coupled with said first-mentioned means for averaging, over a given time interval, the time that said first-mentioned means is in its first state by generating a signal whose magnitude progressively increases with time when said first-mentioned means is in its first state and progressively decreases with time when said first-mentioned means is in its second state;

means for taking the instantaneous value of an engine operating parameter to provide another signal;

means for modifying one of said two signals by the other of said two signals to provide a modified signal;

and means for utilizing said modified signal in controlling the engine.

52. In an engine having a spark ignition system including a spark timing control means for developing a resultant spark timing signal for controlling the engine angle at which spark ignition occurs relative to a fixed engine angle, the improvement comprising:

an engine start spark advance means for always providing a controlled start advance signal component of said resultant spark timing signal upon starting of the engine regardless of engine temperature for a predetermined time interval subsequent to initial engine starting, said engine start spark advance means comprising;

means for establishing an initial magnitude of said controlled spark advance signal which is representative of a given amount of said spark advance;

means for thereafter progressively diminishing the magnitude of said controlled spark advance signal, and means for supplying said controlled spark advance signal to said spark timing control means.

53. The improvement according to claim 52 wherein said engine start spar advance means is controlled from the ignition switch start contacts.

54. The improvement according to claim 52 wherein said engine start spark advance means includes means for maintaining said initial magnitude of said controlled spark advance signal component for a predetermined time interval before the progressive diminishment thereof.

55. In an engine having a spark ignition system including spark timing control means for controlling the engine angle at which spark ignition occurs relative to a fixed engine angle, the improvement comprising:
means for generating a throttle advance signal representative of throttle operation including,
means for generating said signal as a function of both throttle position and rate of change of throttle position,
means for sensing the temperature of ambient air entering the engine for combustion and means for temperature compensating said throttle advance signal in accordance with the sensed temperature of ambient air, and
means for supplying said throttle advance signal to said spark timing control means.

56. In an engine having a spark ignition system including spark timing control means for controlling the engine angle at which spark ignition occurs relative to a fixed engine angle, the improvement comprising:
means for generating a throttle advance signal representative of throttle operation including,
means for generating said signal as a function of both throttle position and rate of change of throttle position,
means for supplying said throttle advance signal to said spark timing control means, and
including further means for generating an additional advance signal when the engine throttle is opened from the idle position.

57. In an engine having a spark ignition system including spark timing control means for controlling the engine angle at which spark ignition occurs relative to a fixed engine angle, the improvement comprising:
means for generating a throttle advance signal representative of throttle operation including;
means for temperature compensating said throttle advance signal such that said signal is attenuated in magnitude as the temperature of the ambient air entering the engine increases.

58. The improvement according to claim 57 wherein the rate of increase of throttle opening is a component of said throttle advance signal.

59. The improvement according to claim 57 including further means for generating an additional advance signal when the engine throttle is opened from the idle position.

60. The improvement according to claim 47 wherein said sensing means comprises means for sensing the value of engine manifold vacuum and for generating said output signal in accordance with the value of said vacuum.

61. The improvement according to claim 47 wherein said utilization means comprises a spark timing control means.

62. The improvement according to claim 51 wherein said first-mentioned means comprises a switch operative to a first switch state when the engine is running in said one selected condition and to a second switch state when the engine is running in said another selected condition.

63. The improvement according to claim 51 wherein said one selected condition is engine non-idle and said another selected condition is engine idle.

64. The improvement according to claim 51 including limiting means for limiting both maximally and minimally the value of said first-mentioned signal.

65. The improvement according to claim 51 wherein said means for modifying one of said two signals by the other of said two signals to provide a modified signal comprises means for multiplying said two signals to provide said modified signal.

66. The improvement according to claim 51 wherein said means for taking the instantaneous value of an engine operating parameter to provide another signal comprises means responsive to engine manifold vacuum for providing said another signal in accordance with said vacuum.

67. The improvement according to claim 51 wherein the signal generated by said second-mentioned means progressively increases in discrete increments when said first-mentioned means is in its first state and progressively decreases in discrete increments when said first-mentioned means is in its second state.

68. In a vehicle powered buy an internal combustion engine, an engine control system for providing a control signal useful in controlling the engine, said system comprising:
means for distinguishing between particular vehicle driving modes during running operation of the engine;
means operatively coupled with said first-mentioned means for providing a first signal which during running operation of the engine progressively increases with time when the vehicle is being driven in one particular mode and progressively decreases with time when the vehicle is being driven in another particular mode;
sensing means for sensing the value of an engine operating parameter to provide a second signal representing the value of said parameter; and modifying means for modifying said second signal by said first signal to thereby develop said control signal.

69. A system as set forth in claim 68 wherein said first-mentioned means comprises means for distinguishing between driving modes wherein the engine is in idle and in non-idle.

70. A system as set forth in claim 69 wherein said sensing means comprises means for sensing engine manifold vacuum to provide said second signal according to the value thereof.

71. A system as set forth in claim 70 including means for limiting both maximally and minimally the magnitude of said first signal.

72. A system as set forth in claim 71 including means for permitting said second-mentioned means to progressively increase and decrease said first signal only after the engine operating temperature exceeds a given temperature.

73. In a vehicle powered by an internal combustion engine, an engine spark timing control system for providing a spark timing control signal representing the time at which spark ignition should occur, said system comprising:

means for distinguishing between particular vehicle driving modes during running operation of the engine;

means operatively coupled with said first-mentioned means for providing a first signal which during running operation of the engine progressively increases with time when the vehicle is being driven in one particular mode and progressively decreases with time when the vehicle is being driven in another particular mode;

sensing means for sensing the value of engine manifold vacuum to provide a second signal representing the value thereof;

modifying means for modifying said second signal by said first signal to thereby develop a third signal; and means for utilizing said third signal in developing said spark timing control signal.

* * * * *